United States Patent [19]

Peabody, deceased et al.

[11] 4,103,558

[45] Aug. 1, 1978

[54] BOGIE WHEEL

[76] Inventors: Edwin A. Peabody, deceased, late of Grosse Pointe Woods, Mich.; by Gertrude A. Peabody, administratrix, 1010 Rowlyn Rd., Grosse Pointe Woods, Mich. 48236

[21] Appl. No.: 722,484

[22] Filed: Sep. 13, 1976

[51] Int. Cl.² .................. F16H 55/48; B62D 55/14
[52] U.S. Cl. ..................................... 74/230.7; 305/23
[58] Field of Search ............ 29/159.1, 159.01, 159 R; 74/230.7, 230.5, 230.8, 230.4, 230.3, 230.01; 305/23

[56] References Cited

U.S. PATENT DOCUMENTS

| 2,884,286 | 4/1959 | Pieper | 74/230.01 X |
|---|---|---|---|
| 2,938,757 | 5/1960 | Pieper | 74/230.7 X |
| 3,140,621 | 7/1964 | Stone | 74/230.5 X |
| 3,592,511 | 7/1971 | Hudelson | 74/230.7 X |
| 3,871,241 | 3/1975 | Pestka et al. | 74/230.7 X |

Primary Examiner—Leonard H. Gerin
Attorney, Agent, or Firm—Whittemore, Hulbert & Belknap

[57] ABSTRACT

A bogie wheel which has a wheel body composed of laterally spaced radial flanges. The flanges are mounted on a shaft by sealed bearings. A rim extends about the periphery of the flanges. A tire is molded or adhered to the rim.

2 Claims, 3 Drawing Figures

BOGIE WHEEL

SUMMARY OF THE INVENTION

The bogie wheel of this invention is of a type suitable for use on a track-laying vehicle such as an army tank. Bogie wheels of past and present construction have been very expensive to make, difficult to seal against the entry of dirt, and in need of frequent lubrication. One such bogie wheel has the shaft drilled so that lubricant can be forced into the bearing. The shaft is of course weakened by the drilled hole and the maintenance requirements to lubricate have been costly and time consuming.

The bogie wheel of the present invention is relatively inexpensive to manufacture and does not need to be lubricated during its entire service life. The wheel body is composed of a pair of identical radial flanges which are mounted on the shaft by sealed bearings. The rim of the wheel is simply and yet sturdily attached to the wheel body flanges and has a tire molded or otherwise secured to it to complete the wheel structure. A simple bogie wheel construction is provided which is virtually maintenance free.

Other objects and features of the invention will become more apparent as this description proceeds, especially when taken in conjunction with the accompanying drawings wherein.

Figure 1:
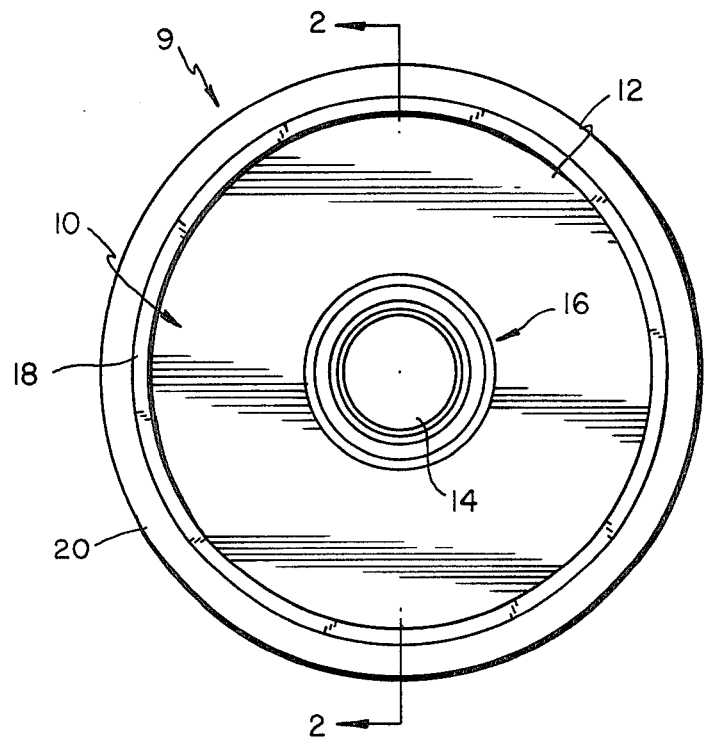
FIG. 1 is a side elevational view of a bogie wheel constructed in accordance with the invention.
Figure 2:
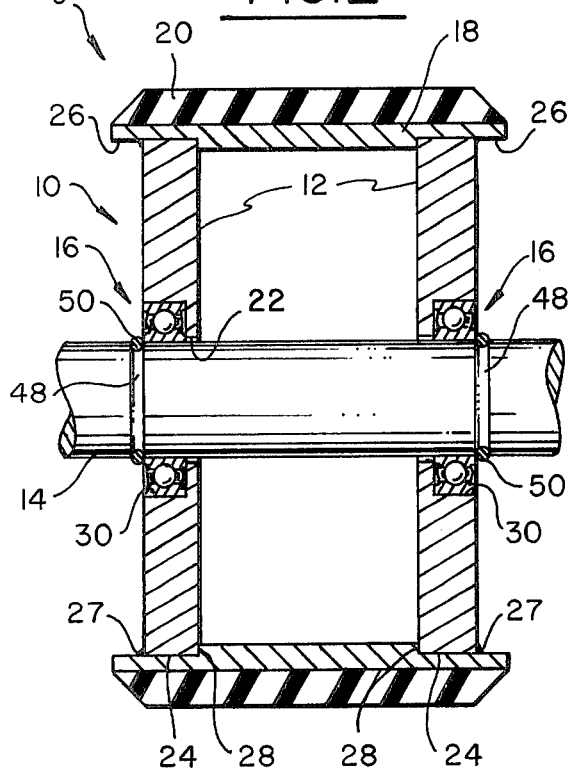
FIG. 2 is a sectional view taken on the line 2—2 in FIG. 1.

Referring now more particularly to the drawings, the bogie wheel is generally designated 9 and has a wheel body 10 composed of identical radial flanges 12 mounted on a shaft 14 by bearings 16. A rim 18 is secured to the outer periphery of the flanges. A tire 20 of rubber or like material is molded upon or otherwise secured to the outer surface of the rim.

The wheel body flanges 12 as stated are identical and preferably are formed of metal, such as a mild steel. The flanges 12 are circular discs each having a central circular hole 22 for receiving the shaft 14 and a cylindrical outer periphery 24.

The rim 18 is likewise preferably of metal such as a mild steel and may be formed from flat strip stock rolled into a cylinder and butt welded. The rim is internally ground adjacent the end portions to provide cylindrical axially outer surface portions 26 which are concentric and of the same diameter as the peripheries 24 of the wheel body flanges. These cylindrical surface portions 26 are of uniform diameter from the outer edges of the rim to the shoulders 28 which separate them from the thicker central portion of the rim. Hence assembly of the wheel body flanges and rim is a simple matter, the flanges being forced axially inwardly into the cylindrical surface portions of the rim against the shoulders 28 and then secured to the rim to complete the assembly. In this instance, the flanges and rim are welded together at the joint 27 throughout the full 360°.

The tire 20 of rubber or like material may be molded upon the outer surface of the rim or secured thereto by cement or any suitable adhesive.

The bearings 16 for mounting the bogie wheel on the shaft 14 are sealed bearings. These bearings are disposed in circular recesses 30 formed in the axially outer surfaces of the flanges around the central hole 22. The inner race 32 of each bearing fits snugly upon and rotates with the shaft, and the outer race 34 fits snugly within the recess and rotates with the flange. The balls 36 which run between the races are held in spaced relation to one another by the spacer 38.

Figure 3:
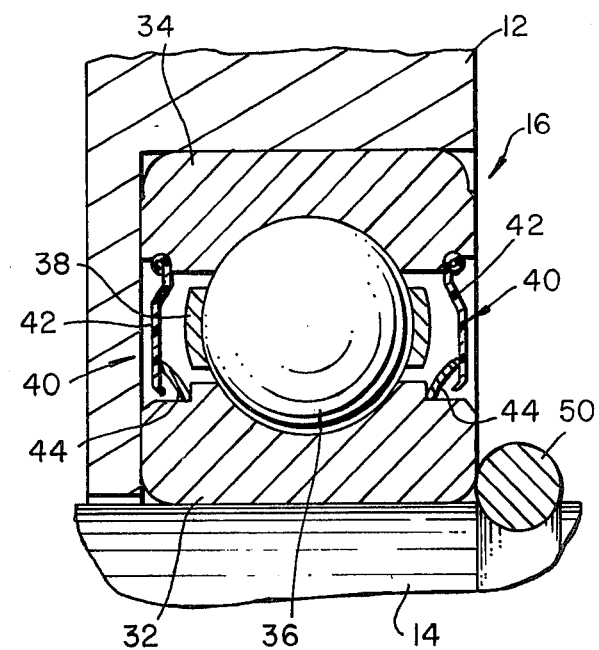
FIG. 3 is an enlarged fragmentary view of a portion of FIG. 2.

Each bearing is sealed by seals 40 each composed of a shield 42 and a ring 44. A seal is provided on each side of the bearing. The ring 44 is preferably a ring of Teflon material having the arcuate cross section shown in FIG. 3 and secured to the inner race 32. The shield 42 is preferably a metal ring which is secured to the outer race and extends radially inwardly towards the inner race in overlapping relation to the Teflon ring. As shown, the outer or free edge of the Teflon ring is seated in the rotating inner race and presses outwardly against the shield with a positive contact to exclude the entry of dirt. The lubricity of the Teflon ring allows for a full 360° contact with the metal shield without undue build up of heat even at high speed operation. Lubricant confined between the inner and outer seals 40 of each bearing permanently lubricates the bearing. The seals prevent the escape of lubricant and the entry of dirt.

The shaft is formed with a pair of annular grooves 48. Snap rings 50 in the grooves bear against the opposite sides of the wheel body 10 to positively locate the bogie wheel axially on the shaft. Actually, such snap rings bear against the inner races of the bearings 16.

The bogie wheel is easy to construct. The assembly and securing together of the flanges and rim as by welding is a simple matter. The wheel body is readily placed on the shaft and locked in position by the snap rings. The bearings once lubricated will retain their lubricant for the life of the bogie wheel, dirt being kept out and the lubricant kept in by the seals 40.

What I claim as my invention is:

1. A bogie wheel comprising a shaft, a wheel body composed of a pair of laterally spaced radially extending annular flanges, a rim extending about the radially outer peripheries of said flanges, sealed bearings mounting said flanges on said shaft, the axially outer surfaces of said flanges at the radially inner edges thereof having recesses in which said bearings are disposed, and removable retainers on said shaft on opposite sides of said wheel body and engageable with said bearings to retain said wheel body on said shaft.

2. A bogie wheel as defined in claim 1, wherein the radially inner surface of said rim has axially outer cylindrical surface portions receiving the radially outer peripheries of said flanges, shoulders defining the axially inner limits of said axially outer cylindrical surface portions against which said flanges abut, said axially outer cylindrical surface portions being of uniform diameter from the axially outer edges of said rim to said shoulders to facilitate assembly of said rim and flanges, and means securing said rim and flanges together.

* * * * *